Patented July 6, 1926.

1,591,619

UNITED STATES PATENT OFFICE.

HARRY D. GIBBS, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PROCESS OF MAKING PHTHALIC ANHYDRIDE.

No Drawing. Application filed October 30, 1920. Serial No. 420,603.

This invention relates to the production of phthalic anhydride from derivatives of naphthalene such, for example, as methyl-naphthalenes.

It is well-known that naphthalene can be oxidized catalytically to phthalic anhydride by the action of vanadic oxide catalysts upon mixtures of naphthalene and air, or an oxygen-containing gas in the vapor phase. I have now discovered that derivatives of naphthalene, for example, methyl naphthalenes, can be oxidized in the same way to phthalic anhydride, thus making it possible to employ all of the cruder grades of naphthalene for the production of phthalic anhydride by the vapor phase process.

One way of practicing my invention is set forth in the following example:—

Methyl naphthalene is vaporized into an air stream in such proportions that the oxygen of the air stream is present in about twice the theoretical quantity required for the oxidation of the methyl naphthalene to phthalic anhydride. This gas stream is then passed through, over, or in contact with an oxide of vanadium or of molybdenum at temperatures preferably about 400° C., but which may be varied from 300 to 650° C. The phthalic anhydride produced is condensed from the gas stream in the usual manner.

Oxygen-containing gases can in general be used for the oxidation, but in practice it has been found most economical to use atmospheric air. The proportion of air to hydrocarbon should be in such ratio that the oxygen present is about twice the theoretical quantity required to do the work. This quantity of air may be varied within wide limits from 1½ the theoretical quantity required to 4 or 5 times the theoretical quantity required.

In regard to the catalyst, other catalysts than vanadic oxide may be used, although it is believed that vanadic oxide in the fused condition or upon a carrier as described in my previous patent application, Ser. No. 379,545, filed May 7, 1920, is the best form of catalyst. Other oxidation catalysts can be used; for example, oxides of molybdenum, and to a lesser degree of efficiency, oxides of chromium and titanium.

To illustrate the practical operation of my process, I shall describe in detail the preferred procedure: Crude naphthalene obtained by the separation of the proper coal tar fractions on distillation is freed from a considerable portion of the oils by revolution in a centrifugal machine. This crude naphthalene, which is known commercially as whizzed naphthalene and which may vary greatly in purity, consists principally of pure naphthalene to the extent of 50 to 80%, and usually contains considerable quantities of methyl naphthalenes and other ring compounds. This material is fed at a uniform rate into a vaporizer where it is converted into the gaseous phase and mixed with the desired quantity of air or other oxygen-containing gas. From this vaporizer the gaseous mixture is passed into intimate contact with the catalyst consisting of vanadic oxide either upon a carrier or in particles of varying sizes made from the fused oxide. The temperature of the catalyst is maintained at from 350° to 500° C. The products of the reaction are passed into a condenser where the gases are cooled and phthalic anhydride, benzoic acid, naphthaphthalic anhydride, benzoic acid, naphthalized from the gas phase; these solids are then separated from the gas stream. I have found that fractional separations of these substances can be made in a condenser, so that the products of the reaction can be separated in a comparatively pure state.

The process as above described may be varied in many ways without departing from my invention. Thus, oxygen may be substituted wholly or in part for air, or the air or oxygen may be mixed with a gas which is relatively inert. The gas mixtures may be brought in contact with or forced through the catalyst in many different ways, and it has been found advisable to carry on the reaction at a considerable pressure, varying from one to three atmospheres, that is, from 2 to 4 atmospheres absolute pressure. The proportion of naphthalene and alkyl-naphthalene vapors to the oxygen-containing gas mixture may be varied within wide limits.

I claim:—

1. The process of producing phthalic anhydride which comprises subjecting an alkyl-naphthalene in a gaseous state and mixed with an oxygen-containing gas to the action of an oxidation catalyst at a temperature of from about 300 to 650° C.

2. The process of producing phthalic anhydride which comprises subjecting crude naphthalene, containing an alkyl-naphthalene, in a gaseous state and mixed with an oxygen-containing gas to the action of an oxidation catalyst at a temperature of from about 300 to 650° C.

3. The process of producing phthalic anhydride which comprises subjecting crude naphthalene, containing a methyl-naphthalene in a gaseous state and mixed with an oxygen-containing gas to the action of an oxidation catalyst at a temperature of from about 350 to 500° C.

4. The process of producing phthalic anhydride which comprises bringing a gaseous mixture containing oxygen and vapors of an alkyl-naphthalene into contact with an oxide of vanadium maintained at a temperature of from about 300 to 650° C.

5. The process of producing phthalic anhydride which comprises bringing a gaseous mixture containing oxygen and vapors of crude naphthalene containing an alkyl-naphthalene into contact with an oxide of vanadium maintained at a temperature of from about 300 to 650° C.

6. The process of producing phthalic anhydride which comprises bringing a gaseous mixture containing oxygen and vapors of crude naphthalene containing an alkyl-naphthalene into contact with an oxide of vanadium maintained at a temperature of from about 350 to 500° C.

7. The process of producing phthalic anhydride which comprises subjecting a mixture of air and crude naphthalene vapors containing an alkyl-naphthalene to the action of vanadic oxide at a temperature between 300 and 600° C.

8. The process of producing phthalic anhydride which comprises subjecting a mixture of crude naphthalene vapors and air under an absolute pressure of from 2 to 4 atmospheres to the action of vanadic oxide at a temperature between 300 and 650° C.

9. The process of producing phthalic anhydride which comprises bringing a gaseous mixture containing oxygen and vapors of crude naphthalene containing an alkyl-naphthalene under an absolute pressure of from 2 to 4 atmospheres into contact with an oxidation catalyst at a temperature of from about 300 to 650° C.

10. The process of producing phthalic anhydride which comprises bringing a gaseous mixture containing oxygen and vapors of crude naphthalene containing an alkyl-naphthalene under an absolute pressure of from 2 to 4 atmospheres into contact with an oxide of vanadium or molybdenum at a temperature of from about 300 to 650° C.

In testimony whereof I affix my signature.

HARRY D. GIBBS.

mixed with an oxygen-containing gas to the action of an oxidation catalyst at a temperature of from about 300 to 650° C.

2. The process of producing phthalic anhydride which comprises subjecting crude naphthalene, containing an alkyl-naphthalene, in a gaseous state and mixed with an oxygen-containing gas to the action of an oxidation catalyst at a temperature of from about 300 to 650° C.

3. The process of producing phthalic anhydride which comprises subjecting crude naphthalene, containing a methyl-naphthalene in a gaseous state and mixed with an oxygen-containing gas to the action of an oxidation catalyst at a temperature of from about 350 to 500° C.

4. The process of producing phthalic anhydride which comprises bringing a gaseous mixture containing oxygen and vapors of an alkyl-naphthalene into contact with an oxide of vanadium maintained at a temperature of from about 300 to 650° C.

5. The process of producing phthalic anhydride which comprises bringing a gaseous mixture containing oxygen and vapors of crude naphthalene containing an alkyl-naphthalene into contact with an oxide of vanadium maintained at a temperature of from about 300 to 650° C.

6. The process of producing phthalic anhydride which comprises bringing a gaseous mixture containing oxygen and vapors of crude naphthalene containing an alkyl-naphthalene into contact with an oxide of vanadium maintained at a temperature of from about 350 to 500° C.

7. The process of producing phthalic anhydride which comprises subjecting a mixture of air and crude naphthalene vapors containing an alkyl-naphthalene to the action of vanadic oxide at a temperature between 300 and 600° C.

8. The process of producing phthalic anhydride which comprises subjecting a mixture of crude naphthalene vapors and air under an absolute pressure of from 2 to 4 atmospheres to the action of vanadic oxide at a temperature between 300 and 650° C.

9. The process of producing phthalic anhydride which comprises bringing a gaseous mixture containing oxygen and vapors of crude naphthalene containing an alkyl-naphthalene under an absolute pressure of from 2 to 4 atmospheres into contact with an oxidation catalyst at a temperature of from about 300 to 650° C.

10. The process of producing phthalic anhydride which comprises bringing a gaseous mixture containing oxygen and vapors of crude naphthalene containing an alkyl-naphthalene under an absolute pressure of from 2 to 4 atmospheres into contact with an oxide of vanadium or molybdenum at a temperature of from about 300 to 650° C.

In testimony whereof I affix my signature.

HARRY D. GIBBS.

Certificate of Correction.

It is hereby certified that in Letters Patent No. 1,591,619, granted July 6, 1926, upon the application of Harry D. Gibbs, of Penns Grove, New Jersey, for an improvement in " Processes of Making Phthalic Anhydride," an error appears in the printed specification requiring correction as follows: Page 1, strike out present line 80 and insert instead *quinones and some other compounds crystal;* and that the said Letters Patent should be read with this correction therein that the same may conform to the record of the case in the Patent Office.

Signed and sealed this 24th day of August, A. D. 1926.

[SEAL.]

M. J. MOORE,
*Acting Commissioner of Patents.*

Certificate of Correction.

It is hereby certified that in Letters Patent No. 1,591,619, granted July 6, 1926, upon the application of Harry D. Gibbs, of Penns Grove, New Jersey, for an improvement in "Processes of Making Phthalic Anhydride," an error appears in the printed specification requiring correction as follows: Page 1, strike out present line 80 and insert instead *quinones and some other compounds crystal;* and that the said Letters Patent should be read with this correction therein that the same may conform to the record of the case in the Patent Office.

Signed and sealed this 24th day of August, A. D. 1926.

[SEAL.]

M. J. MOORE,
*Acting Commissioner of Patents.*